United States Patent [19]

Cairns et al.

[11] 4,129,499

[45] Dec. 12, 1978

[54] OIL SEPARATION MATERIAL

[75] Inventors: Roger J. R. Cairns, Woking; Joan M. Howard née Murtagh, Farnham, both of England

[73] Assignee: The British Petroleum Company Limited, London, England

[21] Appl. No.: 773,281

[22] Filed: Mar. 1, 1977

[30] Foreign Application Priority Data

Mar. 9, 1976 [GB] United Kingdom ............... 09311/76

[51] Int. Cl.$^2$ ...................... B01D 17/04; B01D 15/00
[52] U.S. Cl. .................... 210/23 R; 210/40; 210/263; 210/284; 210/DIG. 5
[58] Field of Search ................ 210/36, 23 R, DIG. 5, 210/DIG. 27, DIG. 26, 502, 263, 284, 40; 208/188; 252/328, 329, 330, 331, 358

[56] References Cited

U.S. PATENT DOCUMENTS

| 2,321,884 | 6/1943 | Allam | 210/36 |
|---|---|---|---|
| 2,367,384 | 1/1945 | Tymstra | 210/36 |
| 3,420,709 | 1/1969 | Barrett, Jr. et al. | 210/36 |
| 3,487,928 | 1/1970 | Canevari | 210/40 |
| 3,487,928 | 1/1970 | Canevari | 210/36 |
| 3,645,398 | 2/1972 | Fiocco | 210/84 |
| 3,810,835 | 5/1974 | Ferm | 210/DIG. 27 |
| 3,853,753 | 12/1974 | Jones | 210/36 |
| 3,901,818 | 8/1975 | Durand et al. | 210/36 |
| 3,919,081 | 11/1975 | Mail | 210/23 |

Primary Examiner—Charles N. Hart
Assistant Examiner—David R. Sadowski
Attorney, Agent, or Firm—Morgan, Finnegan, Pine, Foley & Lee

[57] ABSTRACT

Anthracite packed oil water coalescers are treated with certain polymers, e.g. polybutene polyamines to improve their performance when dealing with sea water - oil emulsions.

22 Claims, No Drawings

OIL SEPARATION MATERIAL

This invention relates to a material suitable for removing oil from water contaminated with oil.

In operations where oil contaminated water is produced as an effluent, e.g., in tanker washings and in oil refineries where considerable amounts of water are used, for example, as cooling water, the water is frequently taken from nearby natural or artificial water sources, for example, rivers, canals or the sea. After use, the effluent water is returned ultimately to a natural water source. Before returning the effluent to a water source or disposing of it into a sewage system, contaminating oil must be removed. A process which has been hitherto employed to purify contaminated effluent water includes the step of passing effluent through beds of sand to separate out crude petroleum or petroleum products.

Our copending British application nos. 51097/74; 16815/75 (cognate) (BP Case 3598/3906) discloses a method for separating oil from water contaminated with oil which method comprises passing a contaminated water stream through a plurality of spaced apart purification beds containing solid particles in such manner that the oil coalesces and an oil phase and a water phase are formed.

Materials which can be used in particulate form in the purification beds include anthracite, charcoal polystyrene, polyethylene and polypropylene. Vermiculite and rounded filter sand may also be employed, as may glass beads.

Such materials, while very useful for coalescing fresh water contaminated with oil, are not particularly effective for treating contaminated water containing salts, e.g., sea water.

We have now discovered that treating the purification bed packing material with certain polymers improves its coalescing performance with respect to oil-salt water mixtures.

Thus according to the present invention there is provided a method for the treatment of particulate solids which method comprises
(a) contacting the particles with a solution of a dispersant additive as hereinafter defined, and
(b) treating the contacted particles with a hydrocarbon activating agent, or
(c) carrying out both steps (a) and (b) simultaneously.

Before treatment with the dispersant additive the particulate solids should contain acid sites. these may be naturally present as in anthracite, or may be supplied to inert materials such as sand and glass by oxidation with chromic acid or similar materials.

In general, particle sizes will be in the range 0.1 to 3.0 mm.

Dispersant additives are well known in the lubricating oil formulation art and may be defined as additives which maintain contaminants in fine suspension and prevent them from coagulating.

Suitable dispersant additives include
(1) copolymers which contain a carboxylic ester function and one or more additional polar functions,
(2) hydrocarbon polymers which have been treated with various reagents to introduce polar functions,
(3) N-substituted long chain alkenyl succinimides,
(4) high molecular weight amides and polyamides,
(5) high molecular weight esters and polyesters, and
(6) amine salts of high molecular weight organic acids.

Preferred dispersant additives are branched chain alkyl or alkenyl polyamines in which the alkyl or alkenyl group has a number average molecular weight of 300-2100 and which has a total base number of at least 200.

Preferably the alkyl or alkenyl groups are derived from polymers of copolymers of olefins.

Examples of non-substituted alkenyl and alkyl groups are polypropenyl groups, polybutenyl and polyisobutenyl groups and the corresponding groups without double bonds.

The preferred alkenyl groups are polypropenyl and polyisobutenyl groups.

Preferably the alkyl or alkenyl group is attached to the nitrogen atom of a polyalkylene polyamine such as a polyethylene polyamine or a polypropylene polyamine.

Preferably the polyamine group has at least three nitrogen atoms.

Examples of suitable alkenyl polyethylene polyamines are polyisobutenyl diethylene triamine, polyisobutenyl triethylene tetramine and polyisobutenyl tetraethylene pentamine.

The preparation of suitable polyamines is disclosed in British patent specification 1386620 (BP Case 3342).

Suitable hydrocarbon activating agents include petroleum fractions such as gasoline, naphtha, kerosine and light gas oils, particularly highly refined fractions such as white spirits, and individual paraffinic hydrocarbons such as heptane.

The dispersant additive will normally be obtained as an oil concentrate and may be further diluted with any of the above hydrocarbon fractions before application to the particulate material.

Suitable treatment concentrations are usually 1 gpl or more to ensure complete coverage of the surface of the solid.

The treatment is conveniently effected at ambient temperature. The quantity of treating solution required per gram of particulate material is dependent on the surface area of the latter. Normally adsorption of 2 mgm/m$^2$ occurs and if the solution concentration falls much below 1 gpl, only partial surface coverage will be obtained. The treated material may be dried prior to activation with the hydrocarbon fraction. Alternatively the material may be treated in situ so that adsorption and activation occur in a single step. The particles can be contacted with the solution of the dispersant additive by soaking them in the solution or by passing the solution through a bed of the particles.

According to another aspect of the present invention there is provided a method for separating oil from water contaminated with oil which method comprises passing a contaminated water stream through one or more purification beds containing solid particles treated as hereinbefore described in such manner that the oil coalesces and an oil phase and a water phase are formed.

After passing through the purification bed(s) the stream is preferably allowed to settle for a short period to allow the coalesced oil droplets and water to separate.

Preferably there are two outlets from the settling zone so that separate oil and water streams can be discharged.

Preferably the direction of flow of the water through the beds is at an angle to the beds so that the contaminated water flows through the beds in a direction different to that in which the coalesced oil droplets move under the influence of gravity.

Most preferably, the direction of flow of the water is horizontal and the bed(s) are mounted vertically.

The flow rate should be related to the particle size in the bed and the cross-sectional area of the bed so that some turbulence is created in the liquid as it flows through the bed, but not sufficient turbulence to prevent the deposition of a film of oil on the solid particles nor to strip a deposited film off. This favours the movement of oil droplets across the stream lines in the winding passages between particles in the beds so that they will collide with the oil film on the particles and with each other. The former process traps oil which can be collected and the latter process leads to growth in the size of droplets. If the water velocity is too great, however, the resulting increased turbulence strips the oil film from the particles and breaks up oil droplets, thereby reversing the above effects.

Thus optimum flow rates can be chosen for given bed dimensions and particle sizes in the bed. In general, hydraulic loadings will be in the range 15–50 $m^3/m^2/hr$.

The above method is suitable for treating waters which are relatively free from suspended solid particles. If suspended solids are present, these may interfere with the oil water separation and should be removed beforehand, e.g., by filtration.

According to another aspect of the present invention there is provided apparatus for removing oil from water contaminated with oil which apparatus comprises a container having an inlet and an outlet and one or more purification bed(s) containing solid particles, having been treated by the method as hereinbefore described, disposed between plates having passages therethrough, and a settling zone positioned after the bed or the last bed in the direction of flow of liquid through the container.

Preferably there are two outlets from the settling zone so that separate oil and water streams can be discharged.

If solid suspended material is present then for reasons previously given a filter should be placed before the container.

The filter preferably removes suspended solids above an average particle size of 50 microns, more preferably above 10 microns. In some circumstances filters which remove particles of a size above 1 micron are most preferred.

Conventional types of filter can be used and suitable filters include those in which the filter materials are cotton, viscose, nylon, polyester or other fabric material, glass wool with or without resin coating, resin impregnated paper, stainless steel wire mesh and polytetrafluoroethylene coated wire mesh. A filter using a finer grade of the solid particles used in the purification beds may also be employed. A preferred type of filter is one in which fibres are disposed at an angle to each other to form a network of fibers with the gaps between them of the requisite size.

The present invention is particularly suitable for removing crude petroleum and petroleum products from tanker washings and effluent water. Normally tanker washings and refinery effluent contain from 5–750 mg of crude petroleum or petroleum products per kilogram of water.

In general, the amount of suspended solids in water is very variable, however, typical refinery and ships' aqueous effluents contain 10–500 ppm suspended solids.

As previously stated, there is a relation between the size of the particles in a purification bed and the flow rate of the water through it. In general, particle sizes will be in the range 0.1–3.0 mm.

The bed or beds preferably has or have a length in the range 5 mm to 300 mm.

The bed or beds has or have a length to width ratio in the range 1:50 to 10:1, most preferably 1:10 to 2:1.

The particles are held in position by plates having passages through them in the direction of contaminated water flow. An example of a suitable configuration is particles held in a vertically mounted bed, i.e., with the face of the bed facing a horizontal direction, between perforated plates, e.g., gauze. The contaminated water is passed through the bed under pressure.

If desired, a series of beds may be placed in sequential order and the gap between the beds should be at least 10 mm or from 0.5 to 10 times the maximum width of the bed.

The oil droplets in the contaminated water coalesce and then separate out. This coalescence followed by separation of the oil enables the oil to be separated from oil contaminated water when the particles are saturated with oil. If the particles are flammable they can eventually be disposed of by burning.

The invention is illustrated with reference to the following examples.

The anthracite used is Anthrafilt Grade 1 ex. National Coal Board.

EXAMPLE 1

250 g anthracite particles 0.1–3 mm in size were treated at ambient temperature with 750 ml of an aqueous solution containing 50 ppm cationic polyacrylamide/liter. The anthracite particles were then dried.

EXAMPLE 2

The anthracite particles were untreated.

EXAMPLE 3

250 g anthracite particles were treated at ambient temperature with 750 ml of a solution containing 1 g/l PV30-tetraethylenepentamine in heptane and dried.

EXAMPLE 4

An ethereal solution of diazomethane (containing about 0.1 mole diazomethane) was prepared and kept cool in ice-water. This amount of diazomethane was estimated to be sufficient to treat 1,314 g anthracite and allow excess diazomethane to be present at the end of the reaction. The anthracite particles were weighed into four wide-necked flasks (250 ml, 2 × 500 ml and 1,00 ml) so that the total weight was 1,314 g. Each flask contained about 50, 250, 300 and 700 g anthracite respectively. The required volume of diazomethane solution was measured into a measuring cylinder and this was added to the anthracite, swirling and shaking the flasks to aid mixing. After standing for half-an-hour, the either was decanted away into a stream of running water, the treated anthracite was washed with distilled water and dried in air with filter paper.

The treatment converts labile H into $CH_3$.

EXAMPLE 5

250 g anthracite particles were treated at ambient temperature with 750 ml of a solution containing 1 g/l Hyvis 07-diethylene tetramine in heptane and dried. The dried particles were then packed into a coalescer purification bed and activated with heptane by soaking for 16 hours.

EXAMPLE 6

250 g anthracite particles were treated at ambient temperature with 750 ml of a solution containing 1 g/l Hyvis 30-tetraethylene pentamine in heptane and dried. The dried particles were then packed into a coalescer purification bed and activated with heptane by soaking for 16 hours.

EXAMPLE 7

200 g anthracite particles were treated in situ at ambient temperature with 500 ml of a solution containing 1 g/l Hyvis 30-tetraethylene pentamine. This treatment combines adsorption and activation in a single step.

EXAMPLE 8

200 g anthracite particles were treated in situ with 500 ml of a solution containing 4 gpl Oloa 1200 in SAE 30 lubricating oil. This combines adsorption and activation in a single step.

Oloa 1200 is supplied by Orobis Limited. It is a 50 percent concentrate of the polyisobutenyl succinimide of tetraethylene pentamine in light mineral oil.

EXAMPLE 9

The treatment was as in Example 7. The oil content in the water was increased to 310 ppm.

EXAMPLE 10

200 g anthracite particles were treated in situ with 500 ml of a 2 gpl solution of Oloa 1200 in heptane. This combines adsorption and activation in a single step.

EXAMPLE 11

250 g anthracite particles were treated at ambient temperature with 750 ml of a solution containing 2 gpl of Oloa 1200 in white spirit and dried. The dried particles were then packed into a coalescer purification bed and activated by soaking in white spirit for 16 hours.

EXAMPLE 12

The treated particles of Example 11 were used to coalesce 50 ppm dispersions of Ninian crude oil.

In examples 1-7, 5 double packets of anthracite (1¼ inches long by 2½ inches dia), each separated by a double space, were used. In examples 8, 9, 10, 11 and 12 a single packet (6¼ inches long by 2½ inches dia) of anthracite was used.

Hyvis 07 and Hyvis 30 are polybutenes of number average molecular weight 440 and 1300 respectively sold by BP Chemicals Limited. Hyvis is a Registered Trade Mark of The British Petroleum Company Limited. PV 30 is a polybutene similar to Hyvis 30.

In each case the treated material, or untreated in the case of Example 2, was used as the packing material in a coalescer bed which was used to coalesce (a) a 50 ppm dispersion of Murban crude oil in tap water and (b) a 50 ppm dispersion of Murban crude oil in tap water containing 1% sodium chloride, except in Example 12.

30% removal of oil occurred in the absense of any packing due to creaming of droplets in the settling tank. This was taken as the baseline for the rig.

The following results were obtained.

| Example | Performance (% Oil Removed) | |
|---|---|---|
| | Sunbury Tap Water (STW) | 1% NaCl Solution in STW |
| 1 | 45 | 33 |
| 2 | 60 | 38 |
| 3 | 60 | 30 |
| 4 | 45 | 30 |
| 5 | 94 | 80 |
| 6 | 94 | 89 |
| 7 | 94 | 93 |
| 8 | Not measured | 90 |
| 9 | Not measured | 93 |
| 10 | 91 | 85 |
| 11 | Not measured | 80 |
| 12 | 87 | 80 |

Injection of the salt solution before and after dispersion of the oil in water gave identical results.

Use of each of two oil-in-water demulsifiers at 50 ppm, Naliloc D 2336 and 550 R, gave no improvement in performance.

Increasing the salt concentration to 12% reduced efficiency to 75%.

We claim:

1. A method for separating oil from water contaminated with oil which method comprises passing a contaminated water stream through one or more purification beds containing treated solid particles in such manner that the oil coalesces and an oil phase and a water phase are formed, wherein said treated solid particles comprise solid particles which have been treated with a solution of a hydrocarbon activating agent and a dispersant additive.

2. The method according to claim 1 wherein the particles are selected from the group consisting of anthracite, sand and glass.

3. The method according to claim 1 wherein the dispersant additive is selected from the group consisting of
   (1) a copolymer which contains a carboxylic ester group and one or more additional polar groups,
   (2) a hydrocarbon polymer having a polar group,
   (3) an N-substituted long chain alkenyl succinimide,
   (4) a high molecular weight amide or polyamide,
   (5) a high molecular weight ester or polyester, and
   (6) an amine salt of a high molecular weight organic acid.

4. The method according to claim 3 wherein the dispersant additive is a branched chain alkyl or alkenyl polyamine in which the alkyl or alkenyl group has a number average molecular weight of 300-2,100 and has a total base number of at least 200.

5. The method according to claim 4 wherein the dispersant additive is selected from the group consisting of polyisobutenyl diethylene triamine, polyisobutenyl triethylene tetramine and polyisobutenyl tetraethylene pentamine.

6. The method according to claim 1 wherein the hydrocarbon activating agent is selected from the group consisting of gasoline, naphtha, heptane, kerosene and a light gas oil.

7. The method according to claim 6 wherein the activating agent is heptane.

8. A method according to claim 1 wherein the stream is allowed to settle to allow coalesced oil droplets and water to settle.

9. A method according to claim 1 wherein the direction of flow of the water through the beds is at an angle to the beds so that the contaminated water flows through the beds in a direction different to that in which the coalesced oil particles move under the influence of gravity.

10. A method according to claim 9 wherein the direction of flow of the water is horizontal and the beds are mounted vertically.

11. A method according to claim 1 wherein the hydraulic loading of the water is in the range 15–50 $m^3/m^2/hr$.

12. A method according to claim 1 wherein the water is passed through a filter to remove solid particles before being passed through the purification beds.

13. Apparatus according to claim 7 wherein the settling zone has two outlets, one for the discharge of oil and one for the discharge of water.

14. Apparatus according to claim 7 wherein a filter is positioned before the container.

15. Apparatus according to claim 7 wherein the particles in each purification bed are composed of anthracite, sand or glass.

16. Apparatus according to claim 7 wherein the size of particles in each bed is in the range 0.1 to 3.0 mm.

17. Apparatus according to claim 7 wherein each bed has a length in the range 5 to 300 mm.

18. Apparatus according to claim 7 wherein each bed has a length to width ratio in the range 1:50 to 10:1.

19. Products whenever separated by a method according to claim 1.

20. Apparatus for removing oil from water contaminated with oil by coalescing the oil and forming an oil phase and a water phase, said apparatus comprising a container having an inlet and an outlet, one or more purification beds containing treated solid particles wherein each of the beds present is disposed between plates having passages therethrough, and a settling zone positioned after the last bed in the direction of flow of liquid through the container, wherein the treated particles of each bed comprise particulate solids treated with a solution of a dispersant additive and a hydrocarbon activating agent.

21. The apparatus according to claim 20 wherein said purification beds are suitably arranged to cause the direction of flow of the water through the beds to be at an angle to the beds.

22. The apparatus according to claim 21 wherein the direction of flow of the water is horizontal and the beds are mounted vertically.

* * * * *